(12) United States Patent
Williams et al.

(10) Patent No.: US 7,184,903 B1
(45) Date of Patent: Feb. 27, 2007

(54) SYSTEM AND METHOD FOR A SELF-HEALING GRID USING DEMAND SIDE MANAGEMENT TECHNIQUES AND ENERGY STORAGE

(75) Inventors: Bradley R. Williams, Brush Prairie, WA (US); Timothy David John Hennessy, Portland, OR (US)

(73) Assignee: VRB Power Systems Inc., Vancouver (CA)

( * ) Notice: Subject to any disclaimer, the term of this patent is extended or adjusted under 35 U.S.C. 154(b) by 0 days.

(21) Appl. No.: 11/377,034

(22) Filed: Mar. 16, 2006

(51) Int. Cl.
*G01R 21/00* (2006.01)
*G01R 21/06* (2006.01)

(52) U.S. Cl. ....................................................... 702/60

(58) Field of Classification Search .................... 702/60
See application file for complete search history.

(56) References Cited

U.S. PATENT DOCUMENTS 6,219,623 B1 * 4/2001 Wills ........................... 702/60

* cited by examiner

*Primary Examiner*—Michael Nghiem
(74) *Attorney, Agent, or Firm*—John R. Thompson; Stoel Rives LLP

(57) ABSTRACT

A self-healing power grid control system includes a power grid having a plurality of network islands with a plurality of linear and non-linear loads. A plurality of control sensors communicate with the power grid to monitor the electrical characteristics of the power grid. A plurality of controlled relays are in electrical communication with the plurality of non-linear loads. A battery energy storage system (ESS) is in electrical communication with a main power source and a network island. A first restoration controller is in electrical communication with the control sensors, the controlled relays, and with the battery ESS. The first restoration controller receives control signals from the control sensors, and in response to detecting an irregularity in the power grid, automatically actuates the battery ESS to stabilize power to the linear loads, and disconnects selected controlled relays to disconnect power to a calculated percentage of the non-linear loads.

12 Claims, 4 Drawing Sheets

SYSTEM AND METHOD FOR A SELF-HEALING GRID USING DEMAND SIDE MANAGEMENT TECHNIQUES AND ENERGY STORAGE

TECHNICAL FIELD

The present disclosure relates to self-healing power grids, and more specifically, to use of demand side management techniques with battery energy storage to intelligently self-heal a grid.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not to be considered to limit the scope of the disclosure, the embodiments will be described and explained with specificity and detail in reference to the accompanying drawings in which:

DETAILED DESCRIPTION OF PREFERRED EMBODIMENTS

Figure 1:
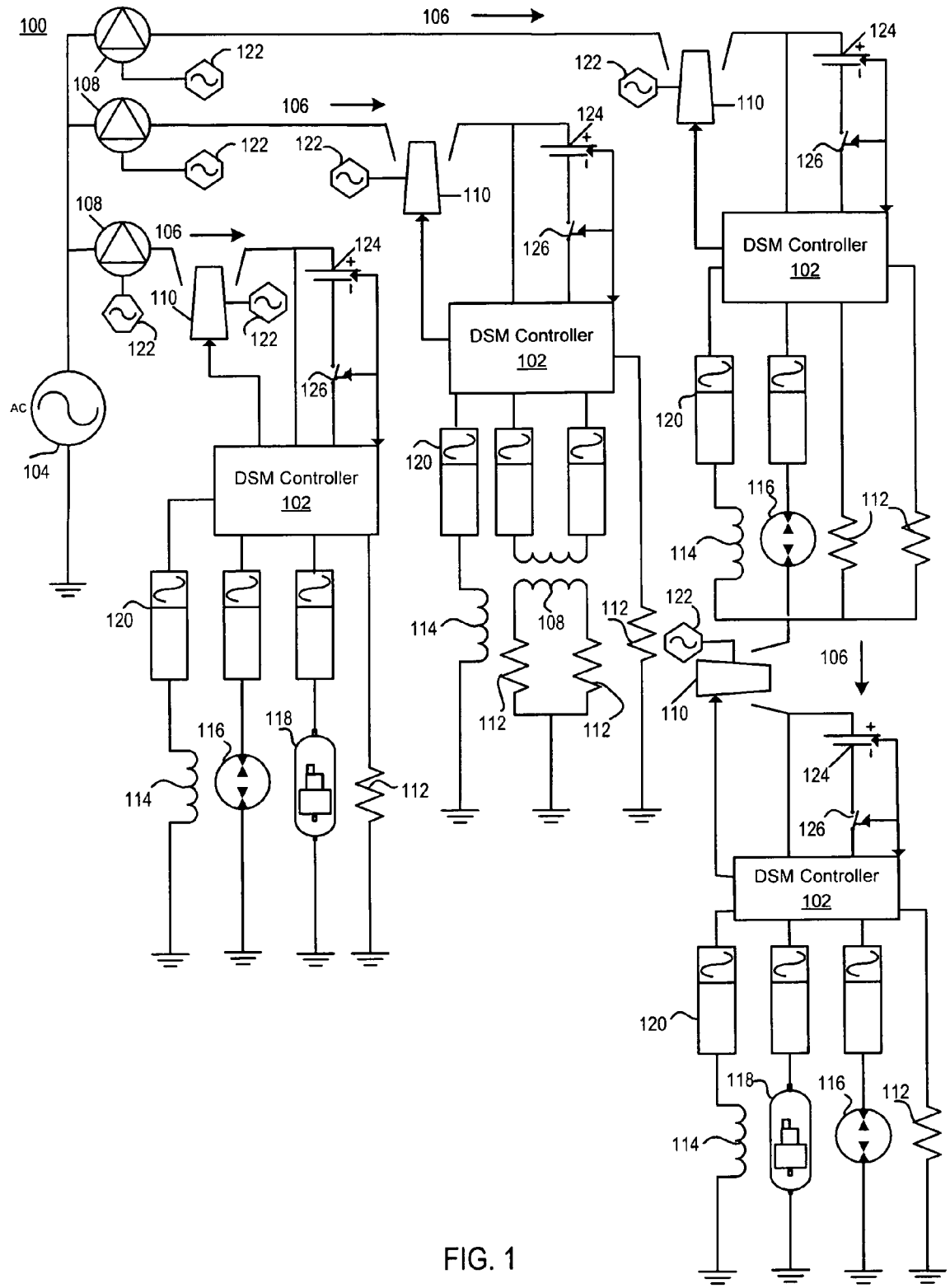
FIG. 1 is a circuit diagram of an embodiment of a self-healing grid using demand side management control and energy storage.

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the invention, as claimed, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to network items that are in electrical communication with each other, and in a nearby section of an electrical gird. The term "in electrical communication with" is not to be construed to require coupling or physical connection, but only electrical signal coordination or the ability to "talk" electrically between components through a circuit or network.

According to the Electric Power Research Institute's (EPRI) *Electricity Technology Roadmap*, "[b]y 2020, the demand for premium power—now just developing—will be pervasive throughout every sector of the economy." Preliminary EPRI estimates indicate that the proportion of U.S. electricity requiring 9-nines reliability (power available 99.9999999% of the time) will grow from 0.6% of current consumption to nearly 10% by 2020, and that the proportion requiring 6-nines reliability will grow from about 8–10% to nearly 60%. In contrast, the average reliability of today's power "at the plug" is only about 3-nines. Therefore, U.S. power grids need much improvement in the next decade to meet future heightened demands of reliability.

In the event of a system grid fault, whether from load-based conditions or from external forces such as lightening, wind, or snow, the network trips and customers are subjected to outages of varying durations depending upon where the fault occurs and how hard it is to repair. In radial systems, all loads downstream of a fault are equally impacted. To reduce the duration of an outage, some form of local power generation or supply of a source of stored power may be employed after ensuring that the grid is first isolated. The latter prevents the generation or supply from feeding back into the total network. However, it would also be useful to predict an irregularity before it occurs, and to provide a fix in the grid to prevent a system fault.

An intelligent, self-healing grid may automate the above process of effectively restoring or stabilizing power to a grid or grid section. Automation of the process allows for a more effective and responsive power flow. It may also enhance reliability while providing customer service during outage periods, as well as reduce operational and maintenance costs while increasing throughput on existing lines. A self-healing grid may also increase grid security in response to the threat of terrorism because it would eliminate the need for human intervention to restore stability to a power grid.

To accomplish these benefits, a self-healing grid may seek to, among other things, dynamically and continuously optimize the performance and robustness of the system, quickly react to disturbances or irregularities in such a way as to minimize impact, and quickly restore the system to a stable operating region, such as to maintain nominal voltage and frequency levels.

FIG. 1 displays one embodiment to exemplify a self-healing grid system 100 of the disclosure, including a plurality of grid restoration controllers 102 (or "restoration controller"). Each restoration controller 102 may control delivery of power from a main power source 104 to a separate network island grid 106 having a plurality of load types, including linear and non-linear. Grid restoration controllers 102 may implement demand side management ("DSM") techniques, which will be explained. An electrically defined island of a power grid may be herein variably referred to as "an island," a "network island," or as a "grid island" 106. The configuration of grid islands 106 will be addressed with reference to FIG. 2.

An island may be located directly off a main power source 104, such as the top three islands 106 in FIG. 1. An island may also be daisy-chained where located in a distant section of a grid, as in the bottom right island 106 in FIG. 1. Electrical power may initially pass, for each island 106 or branch of islands 106, through a main power transformer 108 to ensure proper voltage and current levels for sufficient power delivery to each island 106 or branch of islands 106.

The electrical power may then travel through an isolation breaker 110 before passing into a grid restoration controller 102, the isolation breaker 110 being controllable by the restoration controller 102 in addition to being tripped in response to power surges and the like. Use of the restoration controller 102 may automate control of each island 106, and facilitate real-time self-healing in response to electrical irregularities, including electrical grid faults or disturbances, or in anticipation of the same.

The electrical power may then pass to a plurality of loads within the circuit, as discussed. These loads may include linear loads 112, such that the power factor (the phase between the voltage and current) through the load 112 remains at or near one. The remaining loads are non-linear, having power factors other than one such that the current leads or lags the voltage. Such loads of particular interest include inductive loads 114, pump motors 116, compressors 118, and others which, under low voltage or restart conditions, would demand very large current from the network. The latter may include other short term, non-critical, yet comparatively high power loads. The electrical power may pass, before passing through a non-linear load, through a controlled relay 120 so that the restoration controller 102 may turn on and off power to these loads as a way to stabilize power to the island in the face of an irregularity, including an electrical fault.

Having a power factor nearest to one within the island as a whole during an outage will help an auxiliary power source to deliver stabilized power to a grid island 106 for a longer period. This is because disconnecting large less critical inductive loads, such as those used for commercial purposes, will reduce peak loads when operating in an isolated manner. This allows auxiliary power (including battery storage) to supply the remaining more linear loads in a more expansive and consistent manner than would be otherwise possible. To accomplish this, the restoration controller 102 may calculate the percentage number of non-linear loads that need to be disconnected via controlled relays 120, up to one-hundred percent, to ensure an effective action with regard to the power factor and the peak possible power demands coming from the grid island 106.

A plurality of sensors 122 may also be used throughout the power grid to monitor the electrical characteristics of each island 106, such as voltage, current, frequency, harmonics, etc., and to also monitor the condition of critical electrical components, and relay this information to one or more restoration controllers 102. Thus, each restoration controller 102 is in electrical communication with one or more sensors 122. Sensors 122 may be in electrical communication with critical electrical components such as transformers 108, isolation breakers 110, and feeders, amongst others. Also, the restoration controller 102 may have voltage and line sensors (not shown) internally to monitor the down-stream network of each island 106, thus dynamically sensing changes in load requirements.

The grid restoration controller 102 may then effectuate a positive, self-healing response to an affected island 106 by continuously receiving monitoring signals from sensors 122, and enabling a real-time response to even the slightest irregularity. This allows the grid system 100 to also compensate for, or correct, minor disturbances in an electrical grid before they cause larger disruption, including a fault that may disconnect main power 104 to an entire grid island 106. Potential disturbances could be a transformer 108 with unusual gassing activity or a cable termination with higher than normal partial discharge. The self-healing system 100 may also continuously tune itself to achieve an optimal state based on predetermined criteria, regardless of whatever irregularities are present. To aid the system 100 in this self-tuning and self-healing, a battery energy storage system ("ESS") 124 may be employed for a backup power source.

In conjunction with each network island 106, a battery ESS 124 may be located generally between an isolation breaker 110 and a restoration controller 102. In addition, a switch 126 may be positioned between the battery ESS 124 and the restoration controller 102 to enable the restoration controller 102 to actuate the battery ESS 124, or to turn it off. The restoration controller 102 may also control the battery ESS 124 to allow automatic compensation in the island 106 for disturbances, voltage variations, load imbalances, and the like, that may occur.

The switch 126 and the restoration controller's 102 control of the battery ESS 124 may be optional, however, because some battery ESSs have built-in power control systems that continuously compensate for disturbances, voltage variations, and load imbalances based on voltage and line sensors integrated within the battery ESS 124. One such system is a vanadium redox battery energy storage system 124 ("VRB-ESS"). A VRB-ESS 124 may include an intelligent, programmable, four quadrant power converter (PCS), which is able to continuously monitor the power grid 100 parameters against set points of operation, and to adjust its reactive power and real power outputs continuously. This provides power quality compensation to voltage dips, harmonics, and voltage flicker from, e.g., motor starts, and provides voltage support even when charging the storage element of the VRB-ESS 124. In these aspects, the VRB-ESS 124 may act as a FACTS (Flexible AC Transmission System) device. A FACTS device enables utilities to reduce transmission congestion without compromising the reliability and security of the system.

Thus, use of a VRB-ESS 124 may obviate the need for the switch 126, or for the need to integrate with the restoration controller 102 the voltage and line sensors and compensation control circuitry. However, even with a VRB-ESS 124 employed at a grid island 106, a restoration controller's 102 ability to control the VRB-ESS 124 externally may be still required in order to help compensate, in a coordinated effort, for an irregularity in an adjacent grid island 106. This aspect of a self-healing grid 100 will be discussed later with reference to FIG. 4.

Energy storage systems 124, such as rechargeable batteries, are beneficial for remote power systems that are supplied by, for instance, wind turbine generators or photovoltaic arrays. VRB-ESSs 124 have received favorable attention because they promise to be inexpensive and possess many features that provide for long life, flexible design, high reliability, and low operation and maintenance costs. The VRB-ESS 124 relies on a pumping flow system to pass anolyte and catholyte solutions through its cells. In operating a VRB-ESS 124, flow rates, internal temperatures, pressure, charging and discharging times are all factors that influence power output.

A significant advantage of a VRB-ESS 124 is that it only takes the same time period to recharge the VRB-ESS 124 as it does to discharge it. Conventional lead acid batteries may take over five times their discharge rating to recharge. Thus, a four-hour rated lead acid battery may require 20 hours or more to recharge. In a 24-hour period, a four-hour rated VRB-ESS 124 will be able to fully discharge and charge three times versus just one charge with a lead acid battery. In a 24-hour period, a lead acid battery may be able to only deliver power for four hours with any certainty. A lead acid battery risks power delivery if repeated faults occur on a grid after an initial discharge. With a VRB-ESS 124, power delivery is more available.

Repeated heavy discharges also reduce the life of the lead acid battery. A VRB-ESS 124 does not degrade like a lead acid battery after multiple uses. Furthermore, determining the available state-of-charge (SOC) of a lead acid battery requires that it be discharged under load. A VRB-ESS 124 is able to provide an absolute SOC of its available energy at all times in addition to being more efficient than lead acid batteries. For more information on the VRB-ESS 124, see U.S. patent application Ser. No. 11/234,778, filed Sep. 23, 2005, which is hereby incorporated by reference.

Figure 2:
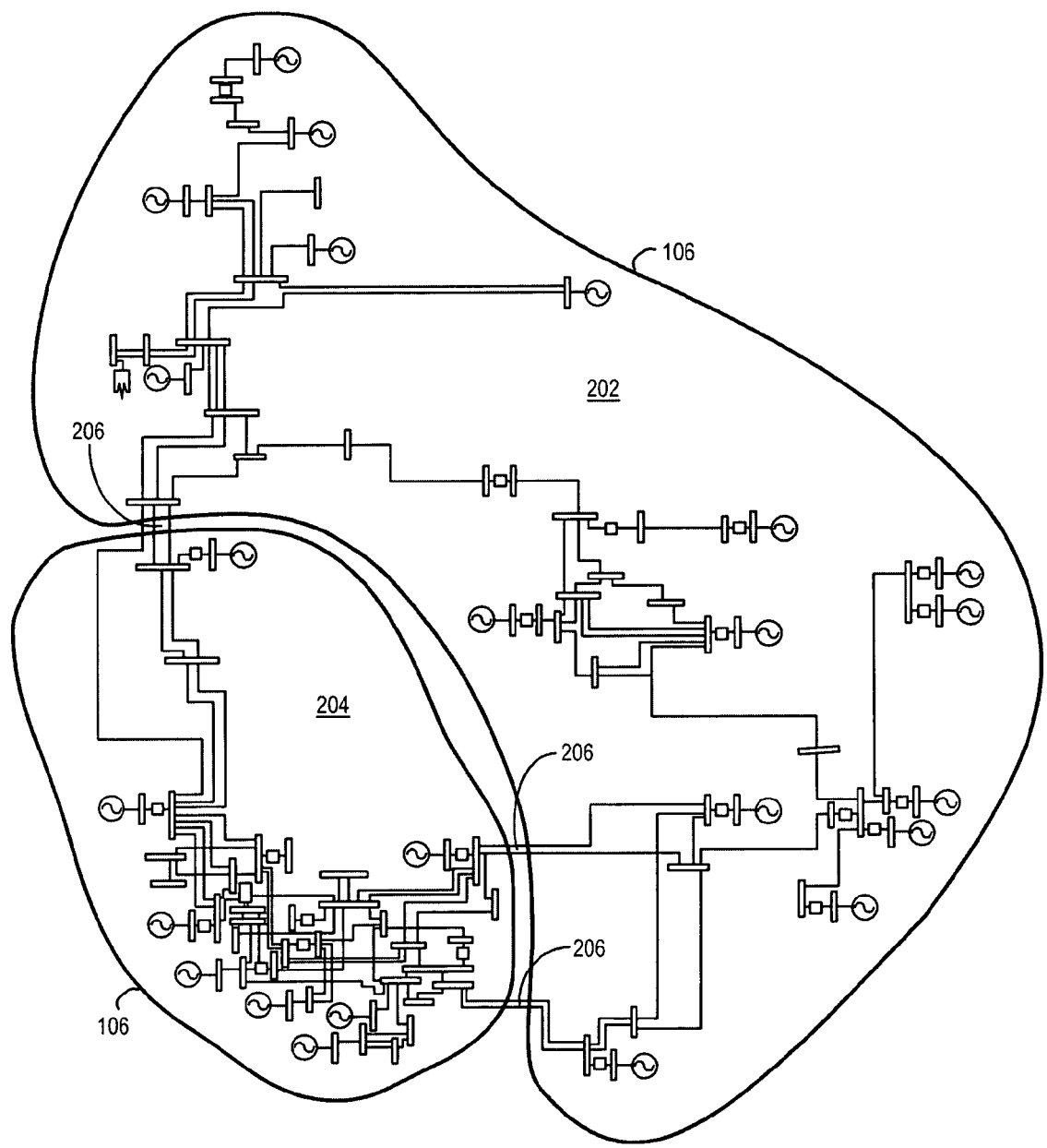
FIG. 2 is a circuit diagram of an embodiment of partitioning network islands of a networked power grid.

FIG. 2 displays a power grid, which may comprise two or more network islands 106. For instance, a geographically large island 202 may be sectioned off because it covers more rural areas and so less power will be required per square mile. In contrast, a geographically small island 204 may be sectioned off as an island 106 because it covers a more urban, densely populated region. This is referred to as intelligent islanding or sectioning, which may be used to automatically separate the grid system 100 into self-sustaining parts, or islands 106, to maintain electricity supply for customers according to specified priorities, and to prevent blackouts from spreading. Where the islands 106 intersect 206 are likely places to have pre-located isolation breakers 110 (not shown) or automated island switches (not shown) with which to provide means to isolate adjacent grid islands, such as 202 and 204 in FIG. 2, in the case of grid irregularity or a blackout of one of the grids 202 or 204.

To determine where to draw the lines of each island, a set of simulations may be run to determine the best system configuration based on actual system conditions. These simulations may include power delivery priorities, such as determining which non-linear loads are most expendable during an irregularity, including a fault which requires to switch, in whole or in part, to a battery ESS 124 for power to the island 106. The simulation may be carried out through the use of computer software into which sets of load data create load profiles and through which power flow may be modeled.

Figure 3:
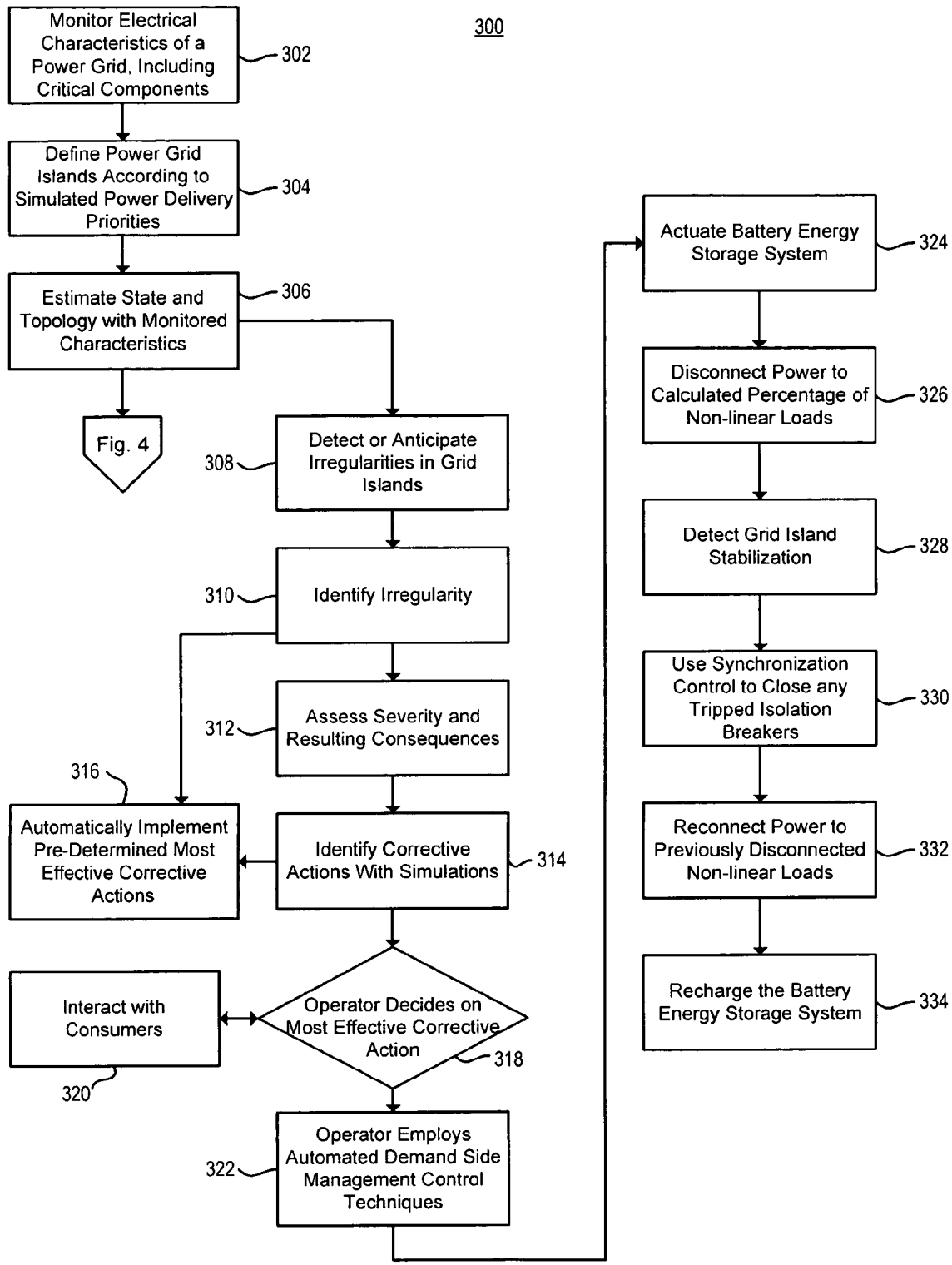
FIG. 3 is a flow diagram of an embodiment of a method for deciding on effective corrective actions to self-heal a power grid from an identified irregularity, to include use of demand side management techniques and energy storage.

FIG. 3 is a flow diagram of an embodiment of a method 300 for deciding on effective corrective actions in response to an irregularity. The method 300 includes DSM techniques and energy storage to quickly restore a self-healing grid 100 to a stable operating region. The method 300 monitors 302 the electrical characteristics of power grid islands 106, including the critical electrical components. The monitored characteristics may include the voltage, current, frequency, harmonics, etc. at different points in the power grid. In one embodiment of method 300, a plurality of power grid islands 106 may be defined 304 according to simulated power delivery priorities based on actual power grid 100 conditions, as discussed above with reference to FIGS. 1 and 2. This adaptive, intelligent islanding ensures the grid system 100 is sectioned into self-sustaining parts, or islands 106, that may be supplied by battery ESS 124 (or other auxiliary power) while providing electricity to prioritized loads and preventing blackouts from spreading.

Method 300 may estimate 306 state and topology with the real-time monitored electrical characteristics of the power grid 100, which may include the individual state and topology of each configured grid island 106. Once an irregularity, such as a grid disturbance or fault, is detected 308, the self-healing power grid 100 may identify 310 the irregularity. The detection 308 of an irregularity may include anticipating that an irregularity may arise, or that a minor disturbance may grow into a worse condition, potentially fault-causing. Thus, once identified 310, the severity and resulting consequences of the identified irregularity may be assessed 312 to determine the quickness of response required to return stability to the grid 100, or to avoid unacceptable instability. This assessment 312 may be accomplished with the use of look-ahead computer simulations of the power flow through the self-healing grid 100 in real time, actual conditions.

The method 300 may further include identifying 314 corrective action with use of similar computer simulations for extrapolating the irregularity throughout the plurality of power grid islands 106. If this corrective action has been pre-determined as the most effective correction action for a given irregularity, the relevant restoration controller 102 may automatically implement 316 the corrective actions once identified 314. In addition, certain irregularities may trigger automatic implementation 316 once the irregularity is identified 310. In the absence of such well-defined corrective action for a given irregularity, the operator or restoration controller 102 may decide 318 on the most effective correction action. This decision-making, given the state and topology of the grid 100 and the irregularity present, may include interacting 320 with consumers. Consumers may participate in the implementation of self-healing operating scenarios to best serve the consumers that may be affected by any given corrective action.

The corrective actions chosen by an operator or a restoration controller 102 may include employing 322 automated DSM control techniques and possibly actuating 324 a battery ESS to provide a self-healing, seamless controlled response. The DSM techniques may further include, in addition to those well-known in the art, disconnecting 326 power to a calculated percentage of non-linear loads, for the reasons discussed with reference to FIG. 1. Once the restoration controller 102 or other regulator in the grid island 106 detects 328 stabilization, the restoration controller may use 330 synchronization control to close any tripped isolation breakers 110. This would have the effect of bringing the grid island 106 back online again to be supplied by a main power source 104, which would make the island grid 106 able to function at or near capacity, including supplying non-linear loads during peak power draws. Thus, the restoration controller 102 may reconnect 332 power to previously disconnected non-linear loads once the grid island 106 has thus stabilized.

Finally, the battery ESS 124 may be recharged 334 if it was previously employed, to return the grid island 106 to a stable operating condition. However, note that the battery ESS 124 may also be used during non-fault conditions to provide for continuous optimization of the grid system 100, and thus may also be recharged on a continuous basis.

Figure 4:
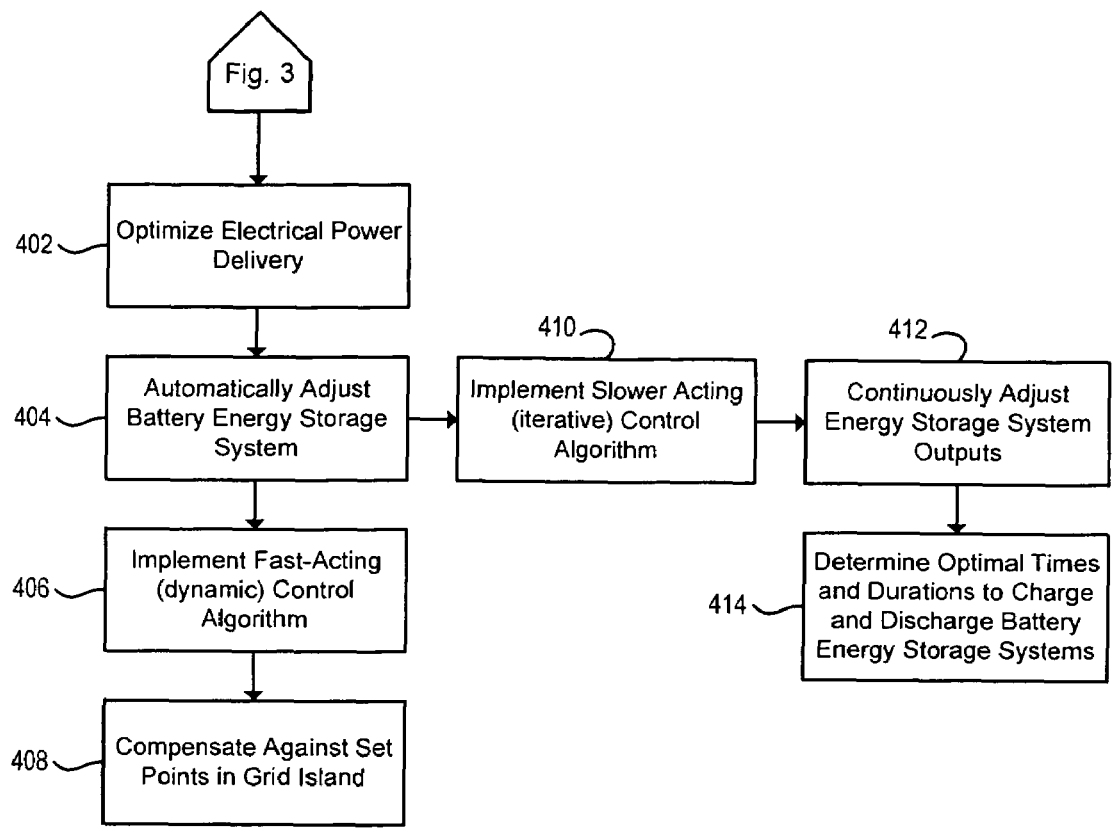
FIG. 4 is a flow diagram illustrating an embodiment of a method for continuously optimizing electrical power to a grid.

FIG. 4 is a flow diagram illustrating a method 400 for continuously optimizing electrical power to a grid. Once the state and topology of a self-healing grid 100 is estimated 306, as discussed with reference to FIG. 3, a self-healing grid 100 may also optimize 402 electrical power. To do so, a restoration controller 102 (or a VRB-ESS) may automatically adjust 404 a battery ESS 124 in the grid network 100, specifically to supply required power to each affected grid island 106, to maintain stability therein. This will enhance reliability and availability to the greatest number of consumers of electrical power on an on-going basis.

Control may be implemented in such a way as to coordinate the rapid compensation provided by a VRB-ESS 124 in order to meet required IEEE/ANSI standards. This may typically involve the calculation of time delays, set points, and coordinated control of tap-changers of battery ESSs 124 via a power line control, which may be the PCS embedded in the VRB-ESS 124 as discussed previously. Such coordination may be effectuated by multiple restoration controllers 102 retaining electrical communication amongst each other. Thus, one grid island 106 may help another grid island 106 compensate, especially where one of the grid islands 106 is not affected by an irregularity and is adjacent an affected grid island 106. Thus, a two stage control loop may be implemented to execute continuous optimization, as follows.

A fast-acting, or dynamic, control algorithm may be implemented 406, which will allow the VRB-ESS 124 to voltage compensate 408 against set points of the self-healing grid 100. Sensed voltage and/or current levels are fed to the VRB-ESS 124 from several points within a grid island 106 via radio waves. Hence, a dynamic compensation of both power and reactive energy will be injected into the self-healing grid 100 to control downstream and upstream voltages alike, to enable quick action to actual or predicted irregularities and to retain the stability of the multiple grid islands 106.

A slower acting, or iterative, control algorithm may be implemented 410 simultaneously whereby the downstream restoration controllers 102 are permitted, after defined time delays, to continuously adjust 412 the battery ESSs 124 in order to bring the system voltages into line with regulations. Feedback to the battery or VRB-ESS 124 will allow restoration controllers 102 to iteratively adjust voltage by use of a slew rate, or smoothing function, which may be applied to ensure that an average voltage is reached and to prevent voltage hunting from occurring. As an additional output, the load optimizing algorithm may be developed for a self-healing grid 100, which would determine 414 the optimal times and durations to charge and discharge the VRB-ESS 124 to produce both favorable technical and economic optimization. To do so, a self-healing grid 100 may be measured over a year's time or more, to see the progress of the algorithms employed, and to adjust the algorithms for greater optimization.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

The invention claimed is:

1. A power grid control system, comprising:
a transmission and distribution electrical power grid having a plurality of network islands, the network islands having a plurality of linear and non-linear loads;
a plurality of control sensors in communication with the power grid to monitor the electrical characteristics of the power grid;
a plurality of controlled relays in electrical communication with the plurality of non-linear loads;
a battery energy storage system in electrical communication with a main power source and a network island; and
a first restoration controller in electrical communication with the plurality of control sensors, controlled relays, and with the battery energy storage system, the first restoration controller to receive control signals from the plurality of control sensors, and in response to detecting an irregularity in the power grid, automatically actuating the battery energy storage system to maintain nominal voltage and frequency to the linear loads, and disconnecting selected controlled relays to disconnect power to a calculated percentage of the non-linear loads.

2. The control system of claim 1, wherein the first restoration controller returns the power grid to a normal configuration after the irregularity is cured.

3. The control system of claim 2, wherein the irregularity is a tripped isolation breaker or switch, and wherein the first restoration controller detects grid stabilization and then uses synchronization control to close the tripped isolation breaker.

4. The control system of claim 3, wherein the first restoration controller, subsequent to restoration of the tripped isolation breaker, reconnects the selected disconnected controlled relays to return power to the disconnected non-linear loads.

5. The control system of claim 1, wherein the battery energy storage system is a vanadium redox battery.

6. The control system of claim 1, further comprising a second restoration controller in electrical communication with the first restoration controller to coordinate response to the irregularity between two network islands.

7. The control system of claim 1, wherein the plurality of network islands are defined according to a computer simulation of load data of the power grid matched with a set of specific power delivery priorities.

8. The control system of claim 1, wherein the first restoration controller detects grid stabilization and then recharges the battery energy storage system.

9. The control system of claim 1, wherein the non-linear loads includes pump motors.

10. The control system of claim 1, wherein the non-linear load includes an air conditioner.

11. The control system of claim 1, wherein the non-linear load includes a compressor.

12. The control system of claim 1, wherein the non-linear load includes a short-term, non-critical, yet comparatively high power load.

* * * * *

UNITED STATES PATENT AND TRADEMARK OFFICE
CERTIFICATE OF CORRECTION

| | | |
|---|---|---|
| PATENT NO. | : 7,184,903 B1 | Page 1 of 1 |
| APPLICATION NO. | : 11/377034 | |
| DATED | : February 27, 2007 | |
| INVENTOR(S) | : Bradley R. Williams et al. | |

It is certified that error appears in the above-identified patent and that said Letters Patent is hereby corrected as shown below:

Column 1, line 57, "... of an electrical gird." Change to --of an electrical grid.--

Column 2, line 10, "... such as lightening, ..." change to --such as lightning,--

Signed and Sealed this

First Day of May, 2007

JON W. DUDAS
*Director of the United States Patent and Trademark Office*